United States Patent [19]
Benham et al.

[11] Patent Number: 5,755,077
[45] Date of Patent: May 26, 1998

[54] FOOD ITEM FABRICATING APPARATUS AND METHODS

[75] Inventors: Richard O. Benham, New Hope; Sheryl S. Brunken, Delano; Robert C. Dechaine, Crystal; Timothy J. Gluszak, Eden Praire; Rene K. Smethers, Crystal; Craig E. Zimmermann, Waconia, all of Minn.

[73] Assignee: General Mills, Inc., Minneapolis, Minn.

[21] Appl. No.: 809,537

[22] PCT Filed: Sep. 19, 1994

[86] PCT No.: PCT/US94/10476

§ 371 Date: Mar. 14, 1997

§ 102(e) Date: Mar. 14, 1997

[87] PCT Pub. No.: WO96/08971

PCT Pub. Date: Mar. 28, 1996

[51] Int. Cl.⁶ .................................................. B65B 63/00
[52] U.S. Cl. .................. 53/428; 53/122; 53/435; 53/514; 53/453; 53/559; 426/125; 426/417; 426/517
[58] Field of Search .................... 425/335, 363; 426/104, 115, 125, 414, 415, 512, 517; 53/122, 514, 154, 155, 237, 238, 428, 435, 445, 474, 453, 454, 559, 560

[56] References Cited

U.S. PATENT DOCUMENTS

| | | |
|---|---|---|
| D. 218,726 | 9/1970 | La Mothe et al. |
| D. 234,099 | 1/1975 | Gobble |
| D. 247,071 | 1/1978 | Neidenberg et al. |
| D. 252,536 | 8/1979 | Goglanian et al. |
| D. 283,748 | 5/1986 | Duty |
| D. 358,699 | 5/1995 | Benham et al. |
| D. 358,962 | 6/1995 | Benham |
| D. 360,969 | 8/1995 | Uecker et al. |
| D. 373,231 | 9/1996 | Gluszak et al. |
| D. 373,232 | 9/1996 | Gluszak et al. |
| D. 373,233 | 9/1996 | Gluszak et al. |
| D. 374,969 | 10/1996 | Gluszak et al. |
| D. 375,183 | 11/1996 | Gluszak et al. |
| D. 375,395 | 11/1996 | Gluszak et al. |
| D. 376,037 | 12/1996 | Gluszak et al. |
| 2,227,728 | 1/1941 | Lombi |
| 2,600,222 | 6/1952 | Donofrio |
| 2,700,939 | 2/1955 | Liston |
| 3,050,017 | 8/1962 | Mahler |

(List continued on next page.)

OTHER PUBLICATIONS

Thos. Mills & Bros. Inc.© 1924 p. 28 No. 152 Wafer.

*Primary Examiner*—Daniel Moon
*Attorney, Agent, or Firm*—John A. O'Toole; L. MeRoy Lillehaugen; Alan D. Kamrath

[57] ABSTRACT

Apparatus (10) is disclosed including first and second forming rollers (18, 21) which rotatably abut with an anvil roller (20). The forming rollers (18, 21) each include a periphery forming a continuous forming surface including a plurality of axially and circumferentially spaced grooves (24) each formed as a continuous depression arranged in a serpentine and non-intersecting manner. Food (14) is simultaneously fed between a continuous strip of support material (16) and a continuous ribbon of film material (66) as they pass between a first abutment nip of the first forming roller (18) and the anvil roller (20). After extending partially around the periphery of the first forming roller (18), the materials (16, 66) and the food therebetween pass around an adjustable idler roller (70) to between a second abutment nip of the second forming roller (21) and the anvil roller (20). The food (14) compressed upon the support material (16) by the first abutment nip is in phase with the grooves (24) of the second abutment nip. The film material (66) removes the food (14) from the grooves (24) and can be discarded after passing through the second abutment nip and prior to the support material (16) being cut to longitudinal lengths and widths between the embossed shapes of food (14).

36 Claims, 2 Drawing Sheets

U.S. PATENT DOCUMENTS

| | | |
|---|---|---|
| 3,188,780 | 6/1965 | Mead . |
| 3,218,776 | 11/1965 | Cloud . |
| 3,225,717 | 12/1965 | Page . |
| 3,410,699 | 11/1968 | Peters . |
| 3,418,140 | 12/1968 | Fisher . |
| 3,871,155 | 3/1975 | Blaser . |
| 4,076,207 | 2/1978 | Austin . |
| 4,307,555 | 12/1981 | Mlodozeniec et al. . |
| 4,381,697 | 5/1983 | Crothers . |
| 4,567,714 | 2/1986 | Chasman . |
| 4,571,924 | 2/1986 | Bahrani . |
| 4,578,273 | 3/1986 | Krubert . |
| 4,586,888 | 5/1986 | Anderson . |
| 4,630,426 | 12/1986 | Gentry . |
| 4,882,175 | 11/1989 | Ream et al. . |
| 4,894,978 | 1/1990 | Schonmann et al. . |
| 4,999,206 | 3/1991 | Lortz . |
| 5,146,730 | 9/1992 | Sadek et al. . |
| 5,205,106 | 4/1993 | Zimmermann et al. . |
| 5,284,667 | 2/1994 | Zimmermann et al. . |
| 5,297,947 | 3/1994 | Cardinali . |
| 5,340,599 | 8/1994 | Maruyama et al. . |
| 5,358,727 | 10/1994 | Yates et al. . |
| 5,431,943 | 7/1995 | Sellmann . |
| 5,462,757 | 10/1995 | Booy et al. . |
| 5,536,517 | 7/1996 | Hannaford . |
| 5,683,734 | 11/1997 | Israel . |

FOOD ITEM FABRICATING APPARATUS AND METHODS

BACKGROUND

The present invention generally relates to apparatus and methods for fabricating food items, and particularly to apparatus and methods for fabricating food items including food of a desired embossed shape supported on support material.

The sale of snack-type food products is a highly competitive business. In addition to the particular food components, increasingly the novelty and play value of the product are important in the marketability of any particular food item. For example, fruit-based snack products such as FRUIT ROLL-UPS™ and FRUIT-BY-THE-FOOT™ fruit products have found wide market acceptance.

Accordingly, it is an object of the present invention to provide novel apparatus and methods for the fabrication of food items, which in the preferred form are in the form of a continuous string of food supported upon a relatively rigid strip of support material in a non-intersecting arrangement.

Another object of the invention is to provide apparatus and methods where the food is compressed as strings on the support material without a thin layer of food being present on the support material and between the desired shape of food.

SUMMARY

Surprisingly, the above objectives can be satisfied in the field of food fabrication by providing, in the preferred form, apparatus and methods of food fabrication where a strip of support material and food are simultaneously fed between an anvil surface and a continuous forming surface of a first abutment nip to compress the food into a groove in the desired food shape and onto the support material and then passing the support material between a second abutment nip having a corresponding groove in its continuous forming surface and in phase with the food compressed on the continuous strip of support material.

In preferred aspects of the present invention, the first and second abutment nips are formed by first and second forming rollers rotatably abutting different portions of the periphery of an anvil roller.

In other aspects of the present invention, the phase of the continuous strip of support material and the food compressed thereon can be adjusted by changing the spacing of an idler roller which strips the continuous strip of support material and the food compressed thereon from the first forming roller.

In still other aspects of the present invention, a ribbon of film material is utilized to remove the compressed food from the grooves of the forming roller, with the ribbon of film material located intermediate the food and the forming rollers.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
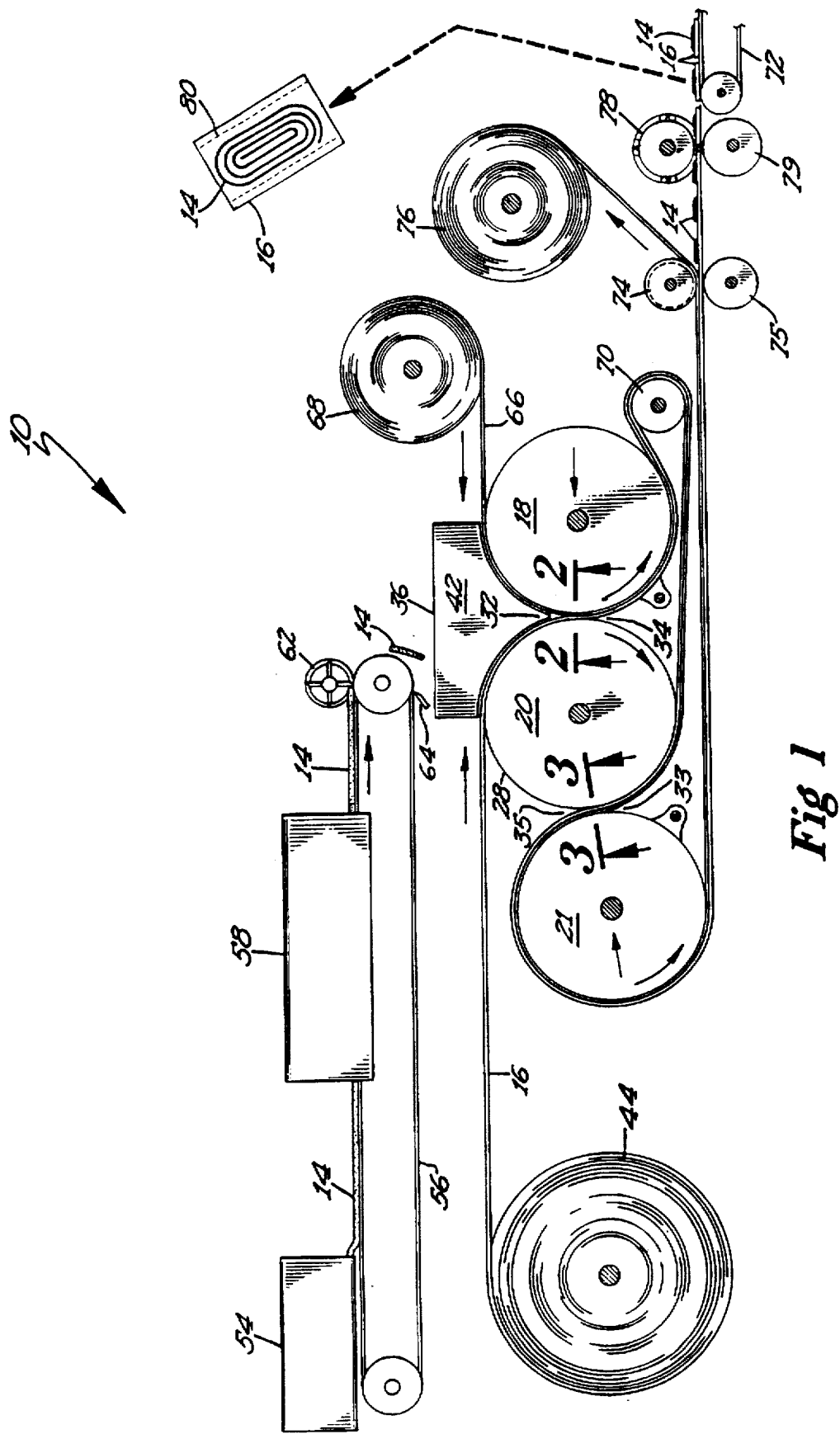
FIG. 1 shows a diagrammatic, side elevational view of an apparatus for fabricating a food item according to the preferred teachings of the present invention, with a food item being exploded and turned therefrom.
Figure 2:
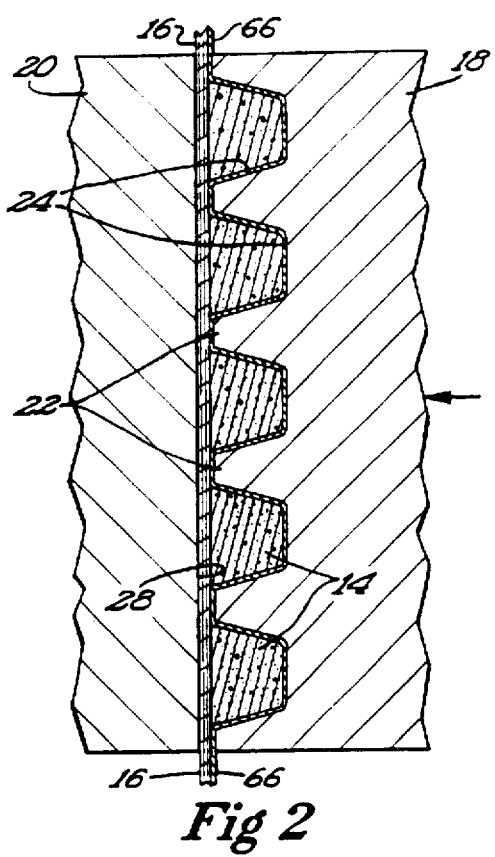
FIG. 2 shows a partial, cross-sectional view of the apparatus of FIG. 1 according to section line 2—2 of FIG. 1.
Figure 3:
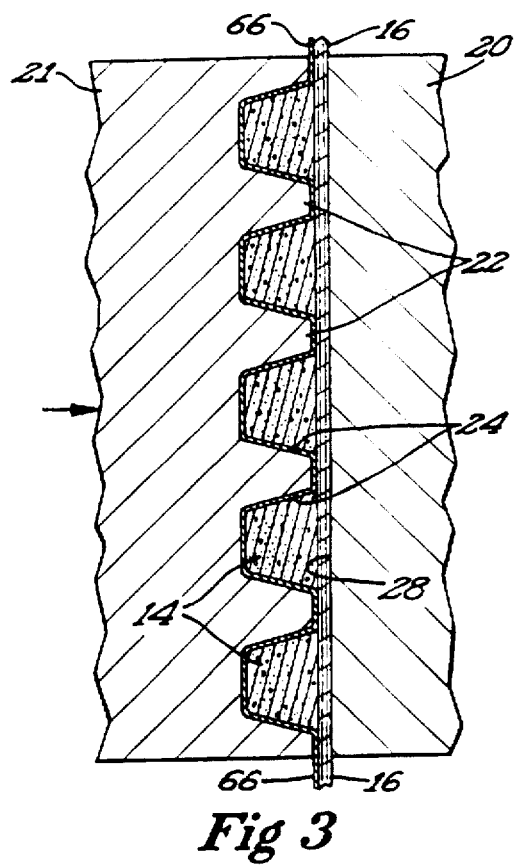
FIG. 3 shows a partial, cross-sectional view of the apparatus of FIG. 1 according to section line 3—3 of FIG. 1.
Figure 4:
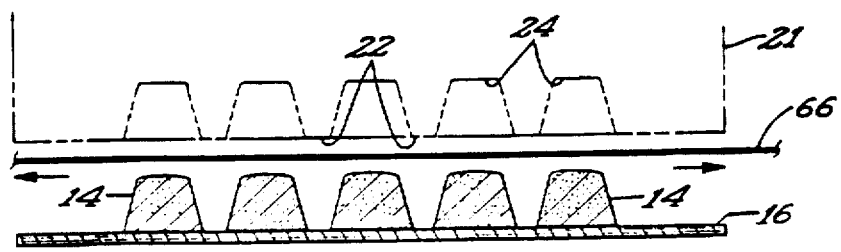
FIG. 4 shows a diagrammatic, partial, end elevational view of the strings of food compressed on a sheet of support material by the apparatus of FIG. 1, with the ribbon of film material and a forming roller shown in phantom being exploded therefrom.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "axial", "longitudinal", "width", "height", and similar terms are used herein, it should be understood that these terms have reference only to the structure shown in the drawings as it would appear to a person viewing the drawings and are utilized only to facilitate describing the invention.

DESCRIPTION

An apparatus utilizing methods for fabricating a food item on a continuous strip of support material according to the preferred teachings of the present invention is shown in the drawings and generally designated 10. The food item generally includes a food 14 of any desired embossed shape supported on support material 16. In the preferred form, food 14 is in the form of a continuous string or rope of material in a nonintersecting arrangement such as an outwardly expanding spiral race track design as shown. In the preferred form, food 14 is a fruit-based material and in the most preferred form is in the form of a composition including a fruit base such as grape juice or pear concentrate and a gum system. In the most preferred form, fruit puree is absent from the composition. Support material 16 may be formed of any suitable material such as cardboard which has the necessary strength to support food 14 without tearing and without bulkiness to allow compression of food 14 onto support material 16 and which allows food 14 to be easily separated therefrom for consumption.

Apparatus 10 generally includes three rollers 18, 20 and 21. In the preferred form, rollers 18, 20 and 21 will have a tendency to be heated by food 14 and are cooled by any suitable means, not shown, such as by circulating water in the most preferred form and less preferably by pulsating cool water. In the preferred form, roller 18 is cooled to a temperature greater than 90° F. (32° C.) and preferably in the order of 120° F. (49° C.) by circulating warm water having a temperature in the order of 110° F. (43° C.). In the preferred form, rollers 20 and 21 are cooled to a temperature in the order of 40° F. (4° C.) by circulating cold water having a temperature in the order of 36° F. (2° C.).

The periphery defining a continuous forming surface of each forming roller 18 and 21 is grooved and specifically includes a plurality of circumferentially and axially spaced patterns. Each pattern includes one or more depressions or grooves 24, with lands 22 located between grooves 24 in each pattern and also separating the patterns from each other. The width of depressions or grooves 24 is generally equal to the desired width of the strings of food 14 and the height of lands 22 or in other words the depth of depressions or grooves 24 is generally equal to the desired thickness of the strings of food 14. The width of grooves 24 decreases from the peripheries of rollers 18 and 21 towards the center of rollers 18 and 21, with the side walls forming grooves 24 being non-parallel and having an angle greater than 15° relative to each other and in the most preferred form in the order of 20° to 30°. In the most preferred form, the depth of grooves 24 in roller 21 is slightly greater and in the most preferred form is 40% greater than the depth of grooves 24 in roller 18. The axial width of lands 22 between the patterns is generally equal to the desired lateral spacing between the strings of food 14 and the circumferential width of lands 22 between the patterns is generally equal to the desired longitudinal spacing between the strings of food 14. In the most preferred form, grooves 24 of roller 18 have a width in the order of 0.178 inch (0.452 cm) and a depth in the order of 0.125 inch (0.318 cm), with the width of lands 22 between grooves 24 in each pattern being in the order of 0.058 inch (0.147 cm). Grooves 24 of roller 21 have a width in the order of 0.196 inch (0.498 cm) and a depth in the order of 0.176 inch (0.447 cm), with the width of lands 22 between grooves 24 in each pattern being in the order of 0.040 inch (0.102 cm). The patterns can be of the same or different configurations, but each pattern on roll 18 has a corresponding pattern at complementary axial and cirumferential positions on roller 21.

Anvil roller 20 includes a cylindrical periphery 28 defining a continuous anvil surface which is relatively smooth in the most preferred form. Rollers 18 and 20 are rotatably mounted about parallel axes in an abutting relation, with periphery 28 of roller 20 engaging, rolling upon and movable relative to lands 22 of roller 18 along an abutment nip. Likewise, rollers 20 and 21 are rotatably mounted about parallel axes in an abutting relation, with periphery 28 of roller 20 engaging, rolling upon and movable relative to lands 22 of roller 21 along an abutment nip. The nip pressure between rollers 18 and 20 and rollers 20 and 21 is 1,000–2,000 psi (70–140 kg/cm$^2$) in the most preferred form and is obtained utilizing hydraulic pressure to bias rollers 18 and 21 against roller 20. In the most preferred form, rollers 18, 20 and 21 are generally cylindrical and of equal diameters. The axes of rollers 18 and 20 are horizontally offset from each other, with the axis of roller 21 being vertically offset below the axis of roller 20 and horizontally offset from the axis of roller 20 on the side opposite roller 18. The anvil surfaces of the first and second abutment nips between rollers 18, 20 and 21 are located at different portions of periphery 28 of roller 20 and at portions which are less than 180° apart in the most preferred form. Rollers 18 and 20 are rotated in opposite rotational directions to define an upper, mating side 32 and a lower, exit side 34. Similarly, rollers 20 and 21 are rotated in opposite rotational directions to define a lower, feed side 33 and an upper, exit side 35. To allow cleaning, rollers 18 and 21 may be movably mounted relative to and loaded against roller 20 such as by pivotable mounting to allow separation of rollers 18 and 21 from roller 20.

Food 14 is filled into upper mating side 32, with a containment saddle 36 being provided complementary to and for holding food 14 above and evenly feeding material to and within mating side 32. In the preferred form, saddle 36 includes end pieces 42 extending radially between and engaging the peripheries of rollers 18 and 20. In the most preferred form, end pieces 42 extend generally perpendicular to the rotational axes of rollers 18 and 20.

Food 14 in the most preferred form is extruded from an extruder 54 in the form of a single extrudiate rope on a conveyor 56 in the most preferred form at a temperature in the order of 200° F. (93° C.). While on conveyor 56, food 14 passes through an air impingement cooling tunnel 58 to cool the food to a temperature where food 14 is plastic but not flowable and in the most preferred form in the order of 160°–170° F. (71°–77° C.). After cooling tunnel 58 and prior to but closely adjacent the end of conveyor 56, the extrudiate rope of food 14 is cut by a rotating, helical reel type cutter 64 into small segments of a few inches or centimeters in length. Due to the helical nature of the blades of cutter 64, the segments of food 14 are pushed from a linear relation with the extrudiate rope to prevent the ends of the segments of food 14 from reattaching to reform a rope. After cutter 64, the segments of food 14 are allowed to fall by gravity into saddle 36, with any segments of food 14 which adhere to conveyor 56 being scraped therefrom such as by a scraper 64. In the most preferred form, conveyor 56 is positioned above and parallel to the axes of rollers 18 and 20.

Support material 16 typically is supplied from a roll 44 and is threaded to extend over periphery 28 of roller 20 located within saddle 36 and mating side 32, and to extend between the nip of rollers 18 and 20 into exit side 34.

A continuous ribbon of thin film material 66 is typically supplied from a roll 68 and is threaded to extend over lands 22 and grooves 24 of the periphery of roller 18 located within saddle 36 and mating side 32, and to extend between the nip of rollers 18 and 20 into exit side 34. Film material 66 in the preferred form is a plastic material having a low memory and either having characteristics or suitably coated for ease of removal from food 14.

Food 14 is initially located in mating side 32 intermediate support material 16 and film material 66 supported by rollers 20 and 18, respectively. It can then be appreciated that as food 14 and material 16 and 66 are pulled and simultaneously fed between the abutment nip between rollers 18 and 20 by the rotation of rollers 18 and 20, food 14 and material 66 advancing between rollers 18 and 20 will be compressed into grooves 24 such that food 14 will be deposited in the shapes of the pattern formed by grooves 24 upon support material 16, with the width and height of the strings of food 14 generally corresponding to the width and depth of grooves 24. Depending upon several factors, food 14 and material 66 may not be forced to entirely fill grooves 24 as diagramatically shown in the drawings, with such a result clearly being desired at least for consistency in the amount of food 14 compressed on support 16. Rather, food 14 and material 66 may not be forced into the corners of grooves 24 such that food 14 at locations spaced from support 16 will have a more rounded configuration.

It can then be appreciated that if food 14 were fed into saddle 36 as an extrudiate rope, a tendency may exist for the rope to coil upon itself as it falls into saddle 36 creating air spaces or gaps which may prevent food 14 from filling cavities 24. According to the preferred teachings of the present invention, feeding food 14 in the form of segments prevents such coiling and the air spaces created thereby such that consistent filling of cavities 24 is obtained as the food segments tend to be self-distributing. Thus, less operator attention and monitoring is required for apparatus 10 according to the preferred teachings of the present invention.

It should also be appreciated that if food 14 is fed to mating side 32 in a too-hot, flowable condition, food 14 may not be able to compress material 66 completely into grooves 24 resulting in food 14 having a width and depth substantially less than that of grooves 24. Similarly, if food 14 is fed to mating side 32 in a too-cold, waxy condition, food 14 may not be pulled between the abutment nip between rollers 18 and 20 to fill grooves 24 and thus also resulting in food 14 having a width and depth substantially less than that of grooves 24. Likewise, if rollers 18 and 21 are too hot, material 66 may have a tendency to rip as it is compressed into grooves 24. Further, the nip pressure between rollers 18, 20, and 21 is important to push food 14 into grooves 24 and overcome the stretch resistance of material 66 of being compressed into grooves 24 and to minimize or prevent flashing by food passing between the peripheries of rollers 18, 20, and 21 intermediate grooves 24 and being evidenced by a thin film on support material 16 between the strings of food.

Apparatus 10 according to the preferred teachings of the present invention further includes an idler roller 70 having a smooth periphery and an axial length generally equal to that of rollers 18, 20 and 21 and the lateral width of the web support material 16. The diameter of roller 70 is substantially less than and in the most preferred form one-fifth the diameter of rollers 18, 20 and 21. The axis of roller 70 is parallel to the axes of rollers 18, 20 and 21 and vertically offset below the axis of roller 18 generally equal to the radius of roller 18. The axis of roller 70 is horizontally offset from the axis of roller 18 on the side opposite rollers 20 and 21 slightly larger than the radius of roller 18, with at least the horizontal offset of roller 70 being adjustable.

In exit side 34 after the abutment nip between rollers 18 and 20, support material 16 with food 14 and material 66 sandwiched against roller 18 will extend around slightly greater than 90° of the periphery of roller 18 to separate support material 16 from roller 20 and then extend generally tangentially from roller 18. As support material 16 separates from roller 18, material 66 will pull food 14 from grooves 24 of roller 18. It can then be appreciated that material 66 must have sufficient strength to pull food 14 from grooves 24 without tearing or breaking but have sufficient stretchability and flexibility to allow food 14 to be compressed into grooves 24 in the abutment nip of a volume generally equal to that of grooves 24. Additionally, film material 66 has a low resiliency or memory which does not tend to smash food 14 undesirably deforming the shape of food 14 after leaving forming rollers 18 and 21. Specifically, in the most preferred form, the ribbon of film material 66 has a low tensional strength and particularly in the most preferred form will stretch 110% due to the application of a force of less than one pound (0.4536 kg) utilizing the tensional properties of thin plastic sheeting test procedure of ASTM D882. If material 66 had greater tensional strength, less food 14 would be compressed in grooves 24 and thus compressed on support material 16. In the most preferred form, film material 66 is formed of linear low density polyethylene having a thickness in the order of 0.0005 inches (0.0127 mm). Thicker films tend to have greater tensional strengths, but films thicker than the preferred form might work if possessing the relatively low tensional strength required according to the preferred teachings of the present invention. The diametric size and positioning of roller 70 as disclosed is also important in the ability of material 66 to remove food from grooves 24 of roller 18. It is also believed that the sudden pressure differential between above the nip abutment where food 14 is under pressure as it is compressed into grooves 24 and below the nip abutment where food 14 is not under pressure as it passes the nip abutment tends to pop or remove the food from grooves 24 of roller 18.

Food 14 and material 16 and 66 extends around over 180° of roller 70 such that it is inverted and extends towards rollers 20 and 21, with material 66 holding food 14 against the lower surface of material 16. Material 16 engages periphery 28 of roller 20 generally at a point vertically below the axis of roller 20 and extends on periphery 28 for generally 90° into feed side 33 and passes between the abutment nip between rollers 20 and 21. When entering the abutment nip, material 66 and food 14 enters grooves 24 of roller 21, with grooves 24 further compressing food 14 into the shape of the particular pattern. It was found that compressing food 14 between a single pair of rollers 18 and 20 results in a thin film of food being present upon support material 16 between lands 22 and periphery 28 and between the desired shape of food 14 formed by grooves 24. Compressing food 14 between a second pair of rollers 20 and 21 results in food 14 being in the desired shape of food 14 formed by grooves 24 and generally without food being present upon support material 16 in the form of thin film or flashing between lands 22 and periphery 28.

It can be appreciated that food 14 and material 16 and 66 should enter mating side 33 of rollers 20 and 21 generally in phase with grooves 24 of roller 21. It can then be appreciated that roller 70 can be moved to adjust the phase of food 14 and material 16 and 66 to match that of grooves 24 of roller 21, with adjustment being dependent upon several factors including the stretchability of material 16, the tension placed upon material 16 and like factors.

Figure 5:
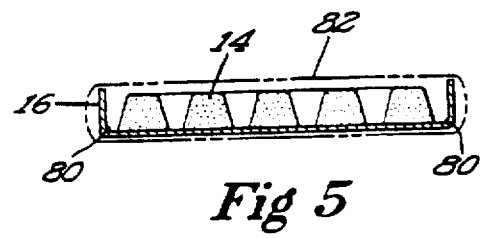
FIG. 5 shows a diagrammatic, cross-sectional view of the food item formed by the apparatus of FIG. 1.

After the abutment nip between rollers 20 and 21, support material 16 with food 14 and material 66 sandwiched against roller 21 extends through exit side 35 and slightly greater than 270° of the periphery of roller 21. Apparatus 10 in the most preferred form further includes a pair of counter rotating rollers 74 and 75 having vertically spaced, parallel axes parallel to and spaced from the axes of rollers 18, 20, 21 and 70. In the most preferred form, roller 75 is a steel roller including a smooth periphery and roller 74 is a rubber coated steel roller including a plurality of lands which roll on material 66 and 16 laterally intermediate the strings of food 14 on material 16, with the depths of the grooves between the lands being at least equal to or greater than the height of food 14 on support material 16. Support material 16 with food 14 and material 66 thereon extends from the periphery of roller 21 horizontally below rollers 18, 20, 21 and 70 due to the vertical offset of roller 21 below rollers 18 and 20 and between the abutment nip of rollers 74 and 75 for pulling upon support material 16. Material 66 extends generally tangentially from roller 74 to a rotated take-up roll 76 at an acute angle in the order of 45° from support material 16 and food 14 extending generally horizontally from rollers 74 and 76. After material 66 has been removed, support material 16 is cut into segments such as by one or more pairs of cutting rollers 78 and 79 to longitudinal lengths and widths between the embossed shapes of food 14. In the most preferred form, support material 16 in addition to being cut to width is perforated at 80 to form flaps having a height generally equal to food 14 which can be folded upward. After cutting to longitudinal lengths by rollers 78 and 79, the individual food items are transferred to a vacuum conveyor 72 for further processing. For example, after cutting and folding, the individual food item can be suitably packaged in a wrapper 82 shown in phantom in FIG. 5 and placed in cartons including the desired number of food items.

The food items fabricated with apparatus 10 according to the methods of the preferred teachings of the present invention generally include support 16 formed of a generally rigid material and specifically 12 or 14 point cardboard of a size of 6.8 inch (17.3 cm) by 2.3 inch (5.8 cm) in the most preferred form. The continuous string of food 14 has first and second, opposite, free ends having an elongated length between the ends substantially greater than the length and width of support 16 and specifically in the order of 54 inches (137 cm). Thus, food 14 has a range density of 3–4 linear inch per square inch (1.2–1.6 linear centimeter per square centimeter) and in the most preferred form in the order of 3.3 linear inch per square inch (1.3 linear centimeter per square centimeter) of support 16. The continuous string of food 14 is removably adhered to the planar upper surface of support 16 in a serpentine and non-intersecting manner. Thus, a consumer can gradually peel the continuous string of food 14 from support 16 while the unpeeled portions remain adhered to support 16 to enhance the play value of the food item. Furthermore, the arrangement of the continuous string of food 14 on support 16 can be varied both in general appearance such as between an outwardly expanding spiral race track design as diagrammatically shown in FIG. 1, an eyeglass design, or other design and/or in the manner that the particular design changes as the continuous string of food 14 is peeled from support 16 and thus increasing the novelty of the food item.

The upper surface of support 16 should include a suitable coating such that food 14 adheres thereto during fabrication, packaging, storage, and other handling but can be generally readily removed therefrom when pulled and without fracturing or otherwise breaking the continuous nature of the string of food 14. In the most preferred form, support 16 includes an extrusion coated, nylon based release coating having a tack release factor characterized by a very low surface energy value. If the surface energy value of support 16 is too high in the order of 30 dynes/cm, the continuous string of food 14 can not be readily removed from support 16. On the other hand, if the surface energy value of support 16 is too low in the order of 15 dynes/cm such as used for the support material in the FRUIT-BY-THE-FOOT™ fruit products, the continuous string of food 14 tends to come off all in one piece rather than in a manner allowing the continuous string of food to be gradually peeled from support 16 according to the preferred teachings of the present invention. Thus, in the most preferred form, the surface energy value of the release coating should be in the range of 15 to 30 dynes/cm, particularly in the order of 20–25 dynes/cm and in the most preferred form in the order of 23–25 dynes/cm. Additionally, the coverage factor must be high and specifically the release coating should cover at least 90% and preferably greater than or equal to 95% and for best results approximately 100% of the surface area of the upper surface of support 16. Food 14 tends to adhere to paper fibers forming support 16 which are not coated by the release coating making removal of those portions difficult.

In the most preferred form, a gram of food 14 is formed into 3 to 10 centimeters and in the most preferred form in the order of 6.5 centimeters of length of string of food 14. If the weight versus length ratio is too low, the string of food 14 will tend to tear as it is pulled from support 16 and if too high will tend to pull off as a single piece from support 16. It can then be appreciated that the weight versus length ratio is related to the width of food 14 at support 16 and the thickness or height of food 14 in a direction generally perpendicular to support 16, with the width and height of food 14 in the string being generally equal in the most preferred form and in the order of 3–4 millimeters and in the most preferred form about 3.2 millimeters.

The use of three rollers 18, 20 and 21 to form the first and second abutment nips according to the preferred teachings of the present invention is believed to be advantageous over forming the first and second abutments from first and second pairs of rollers. Specifically, the number of parts required in apparatus 10 is reduced thus reducing capital and operating costs as well as reduction in the overall size of apparatus 10. Further, lateral tracking, i.e. in a direction perpendicular to the movement of materials 16 and 66, is believed to be easier to obtain when a single anvil roller 20 is utilized.

It is believed that fabrication of the food item according to the preferred teachings of the present invention is advantageous over other fabrication techniques such as injection molding including at least due to continuous fabrication reasons resulting in reduced costs and greater capacities.

Likewise, although it is believed that the arrangement of food 14 as a continuous string in a serpentine and non-intersecting manner is advantageous at least due to the novelty and play value of the product, food 14 can have other arrangements such as but not limited to a continuous string in an intersecting manner or other shapes according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method of fabricating a food item including a food in a shape supported upon a support material comprising the steps of: providing a continuous strip of support material, with the continuous strip of support material being formed of a generally rigid material; passing the continuous strip of support material between a first abutment nip including an anvil surface and a continuous forming surface movable relative to the anvil surface, with the forming surface including at least a first groove having the food shape; simultaneously feeding food between the first abutment nip with the continuous strip of support material to compress the food into the groove of the forming surface; passing the continuous strip of support material having the food compressed thereon by the first abutment nip between a second abutment nip including an anvil surface and a continuous forming surface including at least a first groove having the food shape, with the groove of the second abutment nip being in phase with the food compressed on the continuous strip of support material; and cutting the continuous strip of support material into segments after passing through the second abutment nip, with the food compressed on the continuous strip of support material after the cutting of the continuous strip of support material being removably adhered to a surface of the support material.

2. The method of claim 1 wherein the simultaneously feeding step comprises the step of simultaneously feeding food intermediate the continuous strip of support material and the continuous forming surface of the first abutment nip.

3. The method of claim 2 further comprising the step of rotating an anvil roller having a periphery, with the anvil surface of the first abutment nip located at a portion of the periphery of the anvil roller and the anvil surface of the second abutment nip located at a different portion of the periphery of the anvil roller.

4. The method of claim 3 further comprising the step of adjusting the phase of the groove of the second abutment nip to match the phase of the food compressed on the continuous strip of support material.

5. The method of claim 4 further comprising the step of rotating first and second forming rollers with the anvil roller, with the continuous forming surface of the first abutment nip located on the first forming roller and the continuous forming surface of the second abutment nip located on the second forming roller.

6. The method of claim 5 further comprising the step of passing the continuous strip of support material having the food compressed thereon after the first abutment nip and prior to the second abutment nip around an idler roller to separate the continuous strip of support material having the food compressed thereon from the anvil surface and the continuous forming surface of the first abutment nip.

7. The method of claim 6 wherein the adjusting step comprises the step of adjusting the idler roller relative to the second abutment nip.

8. The method of claim 1 further comprising the step of passing a continuous ribbon of film material between the first abutment nip, with the continuous strip of support material located adjacent the anvil surface and the continuous ribbon of film material located adjacent the continuous forming surface; and wherein the simultaneously feeding step comprises the step of simultaneously feeding food between the continuous ribbon of film material and the continuous strip of support material, with the continuous ribbon of film material deflecting into the groove as the food is compressed into the groove.

9. The method of claim 8 further comprising the step of removing the continuous ribbon of film material from the continuous strip of support material and the food compressed thereon prior to the cutting step.

10. The method of claim 8 wherein the providing step comprises the step of providing the continuous strip of support material including an extrusion coated, nylon-based release coating having a tack release factor characterized by a surface energy value in the range of 15 to 30 dynes/cm; and wherein the step of passing the continuous ribbon of film material comprises the step of passing the continuous ribbon of film material formed of linear low density polyethylene having a low tensional force.

11. The method of claim 1 further comprising the step of adjusting the phase of the groove of the second abutment nip to match the phase of the food compressed on the continuous strip of support material.

12. The method of claim 1 further comprising the step of passing the continuous strip of support material having the food compressed thereon after the first abutment nip and prior to the second abutment nip around an idler roller to separate the continuous strip of support material having the food compressed thereon from the anvil surface and the continuous forming surface of the first abutment nip.

13. The method of claim 12 further comprising the step of adjusting the idler roller relative to the second abutment nip to adjust the phase of the groove of the second abutment nip to match the phase of the food compressed on the continuous strip of support material.

14. The method of claim 1 wherein the simultaneous feeding step comprises the steps of: cutting a continuous rope of food into food segments; and simultaneously feeding the food segments between the first abutment nip.

15. The method of claim 1 wherein the passing steps each comprise the step of passing the continuous strip of support material between the abutment nip including the continuous forming surface having the first groove formed as a continuous depression having first and second opposite ends and arranged in a serpentine and non-intersecting manner in the continuous forming surface.

16. The food item prepared by the method of claim 1.

17. Apparatus for fabricating a food item including a food in a shape supported upon a support material comprising, in combination: a first abutment nip including an anvil surface and a continuous forming surface movable relative to the anvil surface, with the forming surface including at least a first groove having the food shape; a second abutment nip including an anvil surface and a continuous forming surface including at least a first groove having the food shape; means for providing a continuous strip of support material; means for simultaneously feeding food between the first abutment nip with the continuous strip of support material to compress the food into the groove of the forming surface and for subsequently passing the continuous strip of support material having the food compressed thereon by the first abutment nip between the second abutment nip, with the groove of the second abutment nip being in phase with the food compressed on the continuous strip of support material; and means for cutting the continuous strip of support material into segments after passing through the second abutment nip.

18. The apparatus of claim 17 wherein the simultaneous feeding means comprises means for simultaneously feeding food intermediate the continuous strip of support material and the continuous forming surface of the first abutment nip.

19. The apparatus of claim 17 wherein the first abutment nip comprises a first forming roller having a periphery including the continuous forming surface, with the first forming roller being rotatable relative to the anvil surface.

20. The apparatus of claim 19 wherein the first abutment nip further comprises, in combination: an anvil roller having a periphery including the anvil surface.

21. The apparatus of claim 20 wherein the second abutment nip comprises a second forming roller having a periphery including the continuous forming surface, with the second forming roller being rotatable relative to the anvil surface.

22. The apparatus of claim 21 wherein the periphery of the anvil roller further includes the anvil surface of the second abutment nip.

23. The apparatus of claim 22 further comprising, in combination: an idler roller spaced from the first and second forming rollers and the anvil roller, with the continuous strip of support material extending tangentially from the first forming roller to the idler roller and then extending tangentially to the anvil roller.

24. The apparatus of claim 23 wherein the idler roller is adjustable relative to the first and second forming rollers to adjust the phase of the groove of the second abutment nip to match the phase of the food compressed on the continuous strip of support material.

25. The apparatus of claim 17 further comprising, in combination: means for providing a continuous ribbon of film material, with the food being fed intermediate the continuous ribbon of film material and the continuous strip of support material, with the continuous ribbon of film material located intermediate the continuous strip of support material and the continuous forming surface.

26. The apparatus of claim 25 wherein the continuous strip of support material includes an extrusion coated, nylon-based release coating having a tack release factor characterized by a surface energy value in the range of 15 to 30 dynes/cm; and wherein the continuous ribbon of film material is formed of linear low density polyethylene having a low tensional force.

27. The apparatus of claim 25 further comprising, in combination: means for removing the continuous ribbon of film material from the continuous strip of support material and the food compressed thereon.

28. Food item comprising, in combination: a support formed of a generally rigid material and having a length, a width, and an upper surface, with the upper surface of the support including an extrusion coated, nylon-based release coating having a tack release factor characterized by a surface energy value in the range of 15 to 30 dynes/cm; and food removably adhered to the upper surface of the support.

29. Food item comprising, in combination: a support formed of a generally rigid material and having a length, a width, and an upper surface; and a continuous string of food having an elongated length substantially greater than the length and width of the support and having first and second, opposite, free ends, with the continuous string of food being removably adhered to the upper surface of the support in a serpentine and non-intersecting manner.

30. The food item of claim 29 wherein the upper surface is planar.

31. The food item of claim 29 wherein the continuous string of food is formed with a fruit base and a gum system.

32. The food item of claim 31 wherein the upper surface of the support includes an extrusion coated, nylon-based release coating having a tack release factor characterized by a surface energy value in the range of 15 to 30 dynes/cm.

33. The food item of claim 32 wherein a gram of food is formed into 3 to 10 centimeters of continuous string, with 1.2 to 1.6 centimeters of continuous string of food being provided for each square centimeter of area of the upper surface of the support.

34. The food item of claim 33 wherein the continuous string of food has a width at the upper surface of the support and a height in a direction generally perpendicular to the upper surface of the support which are generally equal and in the order of 3 to 4 millimeters.

35. The food item of claim 29 wherein the support further includes first and second, parallel, spaced perforations to form flaps which can be folded at non-linear angles to the upper surface, with the continuous string of food located between the first and second perforations.

36. The food item of claim 29 wherein the continuous strip of food is formed and adhered to the upper surface of the support material by passing the support material between a first abutment nip including an anvil surface and a continuous forming surface movable relative to the anvil surface, with the forming surface including at least a first groove having the food shape, and simultaneously feeding food between the first abutment nip with the support material to compress the food into the groove of the forming surface.

\* \* \* \* \*